UNITED STATES PATENT OFFICE.

RUDOLPH BOEHRINGER, OF NEWARK, NEW JERSEY.

OIL COMPOSITION AND PROCESS OF MAKING THE SAME.

1,289,097. Specification of Letters Patent. Patented Dec. 31, 1918.

No Drawing. Application filed June 1, 1916. Serial No. 101,063.

*To all whom it may concern:*

Be it known that I, RUDOLPH BOEHRINGER, a citizen of the United States, and a resident of Newark, in the county of Essex and State of New Jersey, have invented certain new and useful Improvements in Oil Compositions and Processes of Making the Same, of which the following is a specification.

My invention relates to soluble oil compositions and refers particularly to those soluble oil compositions formed at least in part from the resins and method for producing the same.

It is well known that certain oils, fats and fatty acids, which are of themselves insoluble in water, can be converted into soluble compounds by treatment with sulfuric acid and conversion into an alkali-metal salt. These products are known commercially as sulfonated oils, soluble oils, Turkey red oil, etc., and have a wide practical application, especially in the textile and leather trades.

I have found that the oils, fats and fatty acids thus employed may be substituted in part by other products, resulting in the much more economical production of soluble oil compositions possessing superior properties.

The sulfonated products of the resins cannot be obtained by their direct treatment with sulfuric acid, as the high temperatures necessary to melt the resins are so great that the addition of sulfuric acid results in decompositions, producing insoluble products of no value for the purposes indicated.

I have discovered, however, that these resins may be dissolved in oils, fats and fatty acids and maintained in a condition of solution and temperature whereby they may be readily converted into soluble compounds of great value.

If an animal or vegetable oil, fat or fatty acid be heated—the temperature varying somewhat with the particular oil, fat or fatty acid employed—and a resin, such as rosin, be introduced, the latter will be completely dissolved and will remain in solution even upon cooling. This solution of the resin in the oil, fat or fatty acid may be treated with sulfuric acid in the usual way to produce a composition, the alkali-metal salt of which is perfectly soluble in water, the reaction causing the solubility not only of the oil, fat or fatty acid but also of the resin.

This method allows of the use of the cheaper resins and produces a compound which has valuable properties not possessed by the sulfonated oil, fat or fatty acid.

The sulfonation of many of the oils, such as corn oil, lard oil, bean oil, etc., results in a compound containing products which separate out upon standing, these compounds being highly objectionable in the use of the sulfonated oil. I have found that these objectionable compounds are not formed when a resin, such as rosin, is added to the oil before sulfonation, the composition thus produced being therefore more uniform and soluble than the previously known ones. In order to differentiate between these products which contain compounds which separate out upon standing and the products resulting from my process as described and claimed, I use the words soluble and solution in referring to my process and products as descriptive of those products which form a perfect solution or which are in such a state of suspension or emulsion that they will not separate out upon standing. In addition the composition produced by sulfonating the mixture containing the resin is more limpid than that formed by the sulfonation of the oil alone, which is a valuable property of my new compound.

The resins may be added to either the oil, fat or fatty acid or to a mixture of any of them, the resin, however, being more soluble in a fatty acid than in the corresponding oil or fat.

It is naturally advisable that the resin be of a comparatively fine condition in order to facilitate the production of the solution.

By animal and vegetable oils and fats I mean castor oil, cotton seed oil, corn oil, bean oil, lard oil, cod oil, fish oils, tallow, grease, and other oils and fats capable of forming water soluble compounds when treated with sulfuric acid and converted into their alkali-metal salts, and by fatty acids I mean the fatty acids of such oils or fats.

By resins I mean colophony, copal-resin, dammara-resin, fossil-resins such as amber, succinite, &c., guaiacumgurjun and the oleo-resinous exudates of the various species of the *Coniferæ*, such as common turpentine, Canada turpentine, &c.

By sulfonation I mean the treatment of the oil, fat, fatty acid or resin with sulfuric acid in such a manner as to produce a composition which is soluble in water when converted into its alkali-metal salt.

The following is an example of a method of producing one of the soluble compositions of my invention:

25 lbs. ground rosin are slowly added to 25 lbs. corn oil fatty acids previously heated to about 90°, the mixture being stirred until the rosin is completely dissolved. The solution is then cooled and 50 lbs. of corn oil are added. 25 lbs. sulfuric acid 66° Bé. are slowly added with constant and thorough stirring, care being taken that the temperature of the mixture does not rise above 35° C. The mixture is allowed to stand for 24 hours, or until a test shows that it is soluble in water. It should then be washed with water in the usual manner. The acid thus formed can be converted into a water soluble compound by forming the alkali-metal salt thereof.

I do not limit myself to the particular oils, fats, fatty acids or resins particularly enumerated, nor to the mentioned quantities thereof, nor to the particular mentioned strength of sulfuric acid, nor to the particular method of procedure, all of which may be varied without going beyond the scope of my invention as described and claimed.

What is claimed, is:

1. The process of dissolving a resin in an animal or vegetable oil, fat or fatty acid and treating the mixture with sulfuric acid and neutralizing with an alkali.

2. The process of dissolving a resin in an animal or vegetable oil, fat or fatty acid and treating the mixture with sulfuric acid until the alkali-salts of the compounds thus formed are soluble in water.

3. The process of producing a water soluble composition which comprises treating a mixture of animal or vegetable oil, fat or fatty acid and a resin with sulfuric acid and producing the alkali-metal compounds of the resulting products.

4. The process of sulfonating a resin which comprises dissolving it in an animal or vegetable oil, fat or fatty acid and treating with sulfuric acid until the sulfonated products are soluble in an alkaline aqueous solution.

5. The process of producing a soluble compound of resin which comprises treating a solution of resin in an animal or vegetable oil, fat or fatty acid with sulfuric acid, eliminating the free inorganic acid and neutralizing with an alkali.

6. As a new article of manufacture, the composition capable of being produced by treating a mixture of animal or vegetable oils, fats or fatty acids and resins with sulfuric acid, which possesses the property of reacting with an alkali salt to produce a water soluble composition.

7. As a new article of manufacture, a water soluble composition capable of being produced by treating a mixture of animal or vegetable oil, fat or fatty acid and resin with sulfuric acid and converting the free acid into its alkali-metal salt.

8. As a new article of manufacture, a water soluble composition containing the sulfonated products of an animal or vegetable oil, fat or fatty acid and resin.

9. As a new article of manufacture, the composition produced by treating a mixture of animal or vegetable oils, fats or fatty acids and resin in sulfuric acid, and neutralizing with an alkali, said composition possessing the property of being soluble in water.

Signed at Newark in the county of Essex and State of New Jersey this 27th day of May 1916.

RUDOLPH BOEHRINGER.

Witnesses:
E. GARFIELD GIFFORD,
CLARENCE A. SEAMAN.